Feb. 4, 1930.   T. C. HENNEBERGER   1,745,419
APPARATUS FOR TESTING OPEN WIRE JOINTS
Filed Sept. 28, 1927
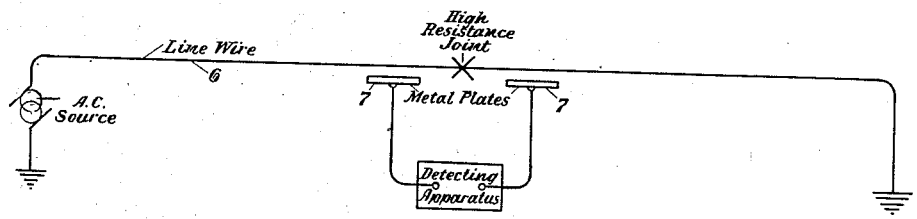
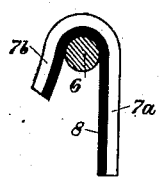
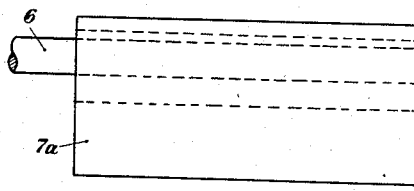
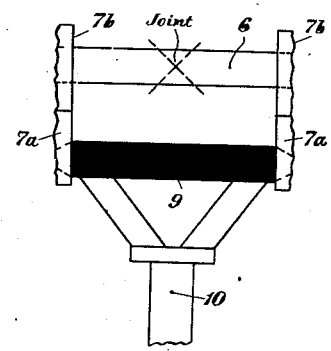
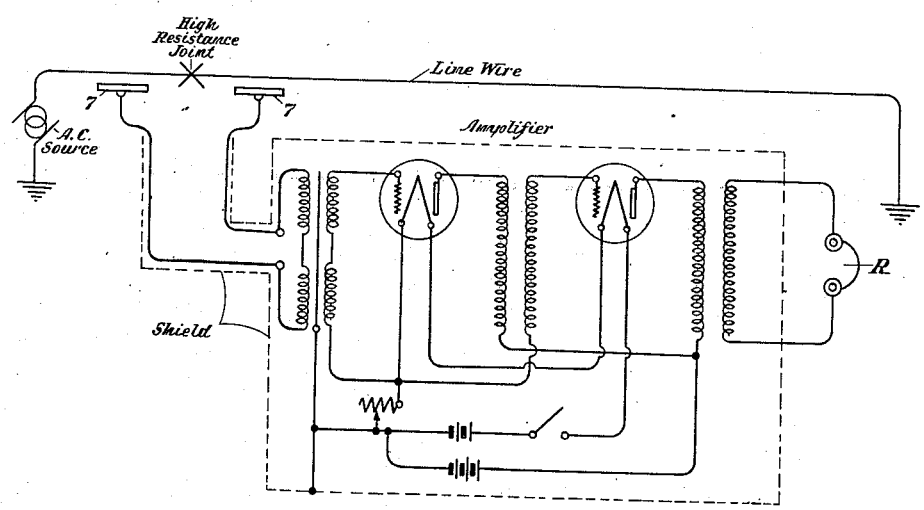
INVENTOR.
T. C. Henneberger
BY
ATTORNEY Patented Feb. 4, 1930

1,745,419

UNITED STATES PATENT OFFICE

THOMAS C. HENNEBERGER, OF MONTCLAIR, NEW JERSEY, ASSIGNOR TO AMERICAN TELEPHONE AND TELEGRAPH COMPANY, A CORPORATION OF NEW YORK

APPARATUS FOR TESTING OPEN-WIRE JOINTS

Application filed September 28, 1927. Serial No. 222,586.

This invention relates to apparatus for testing joints in line conductors of electric current, and more particularly to apparatus for running down high resistance joints in open-wire lines.

The object of the invention is the provision of simple means, easily employed, for "running down" high resistance joints in open wire conductors—that is, for determining the exact point on a faulty conductor where the trouble lies.

High resistance joints are detrimental to the functioning of wire lines, such as open-wire telephone circuits. The wires of such circuits are strung on poles, and heretofore there has been no satisfactory way in which high resistance joints in the wires could be run down.

If suitable electrical contact is made on either side of the joint, and current is passed through the joint, then the potential drop across the joint will indicate the value of the resistance of the joint.

The resistance of a faulty joint in an open-wire conductor is determined in part by such factors as the amount of current which is sent through the joint and the mechanical shaking to which the joint is subjected, and is usually quite variable, ranging from a few tenths of an ohm to high values. If the wire is badly corroded, it is very difficult to make a satisfactory direct electrical contact. Since contact with the wire must be brought about by a lineman working from the ground and using a long pole, any attempt to make direct contact with the wire is almost certain to result in serious shaking of the wire.

In accordance with the applicant's invention, means are provided whereby capacitive rather than metallic coupling with the line wire is made on either side of the joint under test. An alternating current is passed through the joint, and the potential drop across the joint is used as a measure of the resistance of the joint.

The invention will be more clearly understood when the following description is read with reference to the accompanying drawing.

Figure 1 of the drawing shows schematically the line wire, a source of alternating current and the essential elements of the applicant's apparatus for determining the potential drop across a high resistance joint.

Fig. 2 shows a view in end elevation of one of the two devices by means of which capacitive coupling with the wire is obtained.

Fig. 3 shows a view in side elevation of one of the coupling devices.

Fig. 4 indicates a suitable mounting for the two coupling devices whereby they may readily be brought into association with the line wire.

Fig. 5 shows diagrammatically and in part schematically a suitable circuit arrangement for amplifying and detecting the potential drop across the two coupling devices.

Like characters of reference in the several figures of the drawing designate corresponding parts.

With reference to the details of the drawing, and, first, with particular reference to Fig. 1, the line wire 6 has a joint in it which is indicated to be a high resistance joint. A source of alternating current is connected to send current through this joint. Two metal plates 7 are placed one on either side of the joint in proximity to but not in contact with the wire 6. These plates thus placed provide capacitive coupling with the line wire on either side of the joint, and the potential drop across the joint which, of course, is controlled by the resistance of the joint, will appear across the two metal plates. This potential drop is then detected or indicated in some suitable manner, preferably one such as that to be described hereinbelow.

With reference to Figs. 2, 3 and 4 of the drawing, each metal plate is preferably formed with a body portion 7ª and a bent portion 7ᵇ to form a hook which fits over the wire. A lining 8 of insulating material is placed on the inner or under side of the plate to form the dielectric of a condenser having as one plate the device 7 and as the other plate the line wire itself. Since these two metal plates must be brought into the relation with the wire which has been explained, in a convenient manner, each plate is preferably constructed with a length of not more than twelve inches, and the two plates are mounted in fixed relation to each other but separated by a distance of at least eight inches, in order that joints of the maximum length may be included between the plates. A suitable mounting for the plates is indicated in Fig. 4. The plates are fixed to a cross-piece 9, which must be of insulating material in order to provide the proper electrical separation of the plates. This member 9 may then be mounted in any suitable and convenient manner on the end of a pole 10 which, of course, must be in its extended position of sufficient length so that a tester standing on the ground can place the plates over the line wire.

The potential drop across the plates 7 which, of course, is determined by the potential drop through the joint resistance, may be measured or indicated in any suitable manner. Since the impedance of the condenser devices is high, and since the amount of current sent through the joint should be small in order that variations of joint resistance may be minimized, it has been found desirable to interpose a vacuum tube amplifier between the plates and the device employed for detecting the potential drop, as is shown in Fig. 5. The detecting device is shown in that figure as a pair of telephone receivers R, but it is to be understood that any suitable detecting or measuring device may be substituted in place of the receivers. Since the potential drop to be detected is very small in comparison with the potential between the line wire and the ground, it is desirable that the amplifier employed be very well balanced to ground. Accordingly, there is indicated in Fig. 5 an amplifier arrangement having a well-shielded input.

While the invention has been disclosed in one specific embodiment which is deemed desirable, it is to be understood that the scope of the invention is not limited thereby but is defined in the appended claims.

What is claimed is:

1. In association with an open wire having a joint therein and means for sending an alternating current through the joint, two metal plates insulated from each other and adapted to be placed in proximity to but not in contact with the wire, one plate on either side of the joint, a circuit connected between said plates, amplifying means in said circuit, and means in said circuit for detecting the potential drop across said plates.

2. In association with an open wire having a joint therein and means for sending an alternating current through the joint, apparatus for indicating the value of the resistance of the joint, said apparatus comprising two metal plates each formed to fit over the wire and having a lining of insulating material on its under side, said plates being fixed in spaced relation to lie one on either side of the joint and insulated from each other, and means connected across said plates for detecting the potential drop thereacross.

3. In association with an open wire having a joint therein and means for sending an alternating current through the joint, apparatus for indicating the value of the resistance of the joint, said apparatus comprising two metal plates each formed to fit over the wire and having a lining of insulating material on its under side, said plates being fixed in spaced relation to lie one on either side of the joint and insulated from each other, a circuit connected across said plates, amplifying means in said circuit, and means in said circuit for detecting the potential drop across said plates.

In testimony whereof, I have signed my name to this specification this 26th day of September, 1927.

THOMAS C. HENNEBERGER.